United States Patent
Kobayashi et al.

(10) Patent No.: US 11,962,726 B2
(45) Date of Patent: Apr. 16, 2024

(54) PRINTING SYSTEM AND CONTROL METHOD THEREFOR

(71) Applicant: SEIKO EPSON CORPORATION, Tokyo (JP)

(72) Inventors: Daiki Kobayashi, Shiojiri (JP); Hiroto Tsukioka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/454,829

(22) Filed: Aug. 24, 2023

(65) Prior Publication Data
US 2024/0073329 A1    Feb. 29, 2024

(30) Foreign Application Priority Data
Aug. 25, 2022  (JP) ................................. 2022-133909

(51) Int. Cl.
*H04N 1/00*      (2006.01)
*G06F 8/61*      (2018.01)

(52) U.S. Cl.
CPC ........... *H04N 1/00344* (2013.01); *G06F 8/62* (2013.01)

(58) Field of Classification Search
None
See application file for complete search history.

(56) References Cited

U.S. PATENT DOCUMENTS

| | | | |
|---|---|---|---|
| 2013/0016399 A1* | 1/2013 | Kobayashi | ......... H04N 1/32122 358/1.16 |
| 2021/0304337 A1 | 9/2021 | Shishido et al. | |
| 2022/0271936 A1* | 8/2022 | Doney | ................. H04L 9/3231 |

FOREIGN PATENT DOCUMENTS

JP            2021160104 A     10/2021

* cited by examiner

*Primary Examiner* — Darryl V Dottin
(74) *Attorney, Agent, or Firm* — CHIP LAW GROUP

(57) ABSTRACT

A printing system includes an administrator terminal, a user terminal, and a processor that provides a printing service related to a printer configured to be used by the user terminal, in which the processor transmits, based on an expiration date of a contract for the printing service, request information for requesting response information to the administrator terminal and transmits notification information to the user terminal when continuation processing for the contract is not executed based on the response information from the administrator terminal, the user terminal transmits, based on the notification information, inquiry information for inquiring about continuation of the contract to the administrator terminal, the administrator terminal transmits, based on the inquiry information, continuation information for continuing the contract to the processor, and the processor executes, based on the continuation information, the continuation processing and grants permission to use the printing service to the user terminal.

9 Claims, 5 Drawing Sheets

PRINTING SYSTEM AND CONTROL METHOD THEREFOR

The present application is based on, and claims priority from JP Application Serial Number 2022-133909, filed Aug. 25, 2022, the disclosure of which is hereby incorporated by reference herein in its entirety.

BACKGROUND

1. Technical Field

The present disclosure relates to a printing system and a control method therefor.

2. Related Art

Hitherto, there is known a printer that enables a user to operate an operation panel to renew a contract as disclosed in JP-A-2021-160104.

In a case of the above-described apparatus, there is a possibility that, when there is an administrator who manages a contract separately from a user who uses the printer, usage of the printer by the user and contract management by the administrator cannot be properly performed.

SUMMARY

A printing system includes: an administrator terminal; a user terminal; and an information processing apparatus that provides a printing service related to a printer configured to be used by the user terminal, in which the information processing apparatus transmits, based on an expiration date of a contract for the printing service, request information for requesting response information related to the contract to the administrator terminal, is configured to receive the response information from the administrator terminal, and transmits notification information related to the contract to the user terminal when the information processing apparatus does not execute, based on the response information from the administrator terminal, continuation processing for the contract, the user terminal receives the notification information from the information processing apparatus, and transmits inquiry information for inquiring about continuation of the contract to the administrator terminal when an inquiry instruction for continuation of the contract is given based on the notification information, the administrator terminal receives the inquiry information from the user terminal and transmits continuation information for continuing the contract to the information processing apparatus when an instruction for continuation of the contract is given based on the inquiry information, and the information processing apparatus receives the continuation information from the administrator terminal, executes, based on the continuation information, the continuation processing, and grants permission to use the printing service to the user terminal.

A control method for a printing system including an administrator terminal, a user terminal, and an information processing apparatus that provides a printing service related to a printer configured to be used by the user terminal includes: transmitting, by the information processing apparatus, based on an expiration date of a contract for the printing service, request information for requesting response information related to the contract to the administrator terminal; receiving, by the information processing apparatus, the response information from the administrator terminal; transmitting, by the information processing apparatus, notification information related to the contract to the user terminal when the information processing apparatus does not execute, based on the response information from the administrator terminal, continuation processing for the contract; receiving, by the user terminal, the notification information from the information processing apparatus; transmitting, by the user terminal, inquiry information for inquiring about continuation of the contract to the administrator terminal when an inquiry instruction for continuation of the contract is given based on the notification information; receiving, by the administrator terminal, the inquiry information from the user terminal; transmitting, by the administrator terminal, continuation information for continuing the contract to the information processing apparatus when an instruction for continuation of the contract is given based on the inquiry information; receiving, by the information processing apparatus, the continuation information from the administrator terminal; and executing, by the information processing apparatus, based on the continuation information, the continuation processing and granting permission to use the printing service to the user terminal.

DESCRIPTION OF EMBODIMENTS

1. First Embodiment 1-1. Configuration of Printing System

Figure 1:
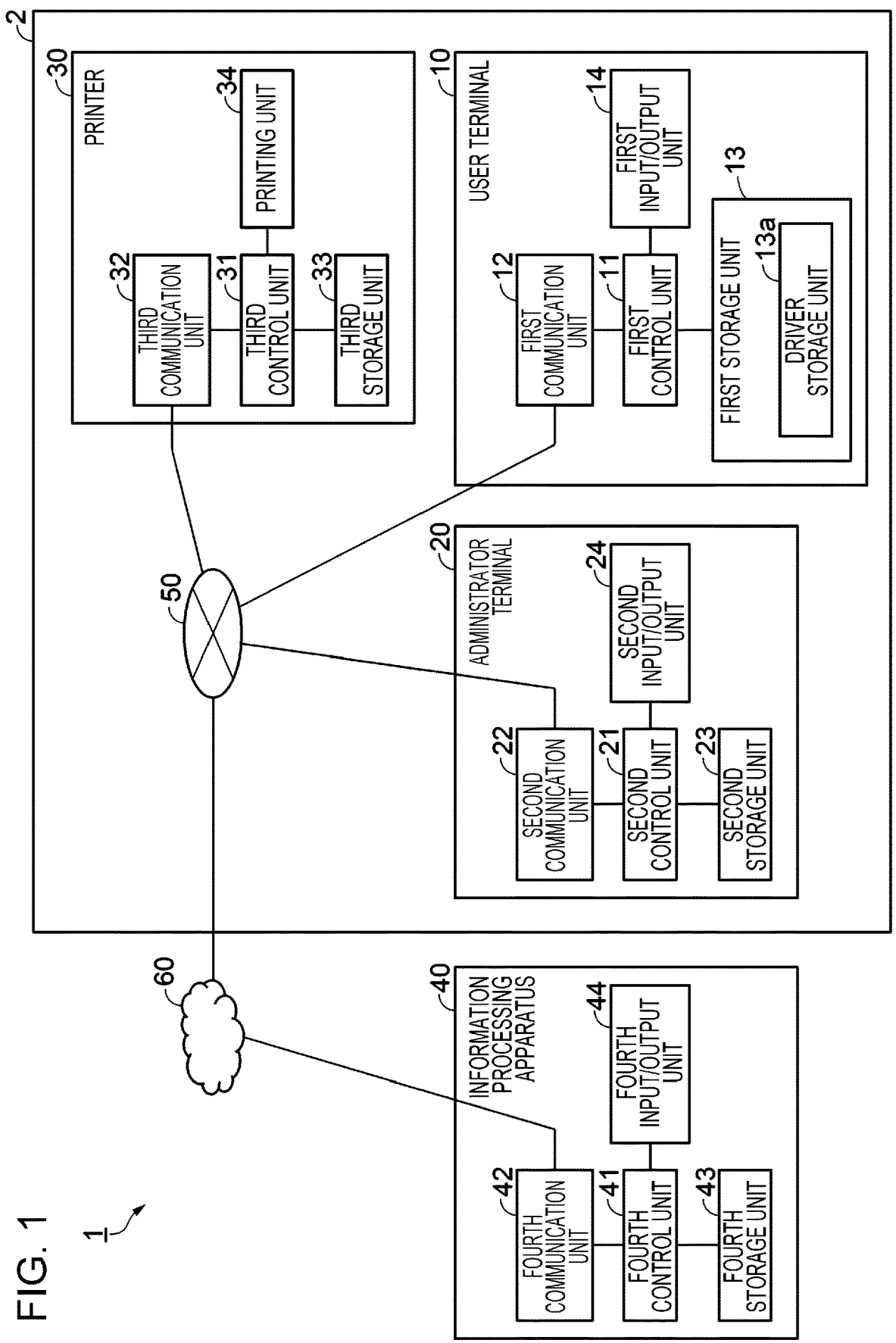
FIG. 1 is a block diagram illustrating a configuration of a printing system including an information processing apparatus, an administrator terminal, and a user terminal.

A printing system 1 according to an embodiment includes a user terminal 10, an administrator terminal 20, and an information processing apparatus 40 as illustrated in FIG. 1. The user terminal 10 and the administrator terminal 20 are connected to a local area network (LAN) 50, which is, for example, a communication network in a company 2 with a limited range, and can communicate with each other. A printer 30 is also connected to the LAN 50. The company 2 indicates the premises of the company where the user terminal 10, the administrator terminal 20, the printer 30, and the LAN 50 are installed. The user terminal 10 is mainly used by a user who uses the printer 30. The administrator terminal 20 is mainly used by an administrator who manages apparatuses connected to the LAN 50.

The user terminal 10, the administrator terminal 20, and the printer 30 can communicate with the information processing apparatus 40 outside the company 2 via the LAN 50 and a wide area network (WAN) 60, which is, for example, the Internet. The LAN 50 includes a router, a firewall, and the like, and has a function that enables communication between the LAN 50 and the WAN 60. The user terminal 10, the administrator terminal 20, the printer 30, and the information processing apparatus 40 are each assigned a unique Internet protocol address (IP address), for example. These apparatuses can communicate with a communication destination by designating an IP address assigned to the communication destination. The information processing apparatus 40 is mainly provided by a provider who provides a printing service to be described below.

The user terminal 10 includes a first control unit 11, a first communication unit 12, a first storage unit 13, and a first input/output unit 14. The first control unit 11 performs overall control of the units of the user terminal 10. The first control unit 11 includes a central processing unit (CPU). The CPU is also referred to as a processor. The first storage unit 13 includes a flash read only memory (ROM) which is a rewritable nonvolatile memory, and a random access memory (RAM) which is a volatile memory. The first control unit 11 reads a program stored in the flash ROM of the first storage unit 13 and executes the program by using the RAM of the first storage unit 13 as a work area.

Further, a driver storage unit 13a of the first storage unit 13 of the user terminal 10 stores a first driver or a second driver, which will be described below, that can control the printer 30. Hereinafter, the first driver and the second driver are collectively referred to simply as the driver. The first control unit 11 can read the driver from the driver storage unit 13a and execute the driver to control the printer 30 to perform printing. Storing the driver in the driver storage unit 13a by the first control unit 11 of the user terminal 10 may be called installation, and deleting the driver from the driver storage unit 13a may be called uninstallation.

The first communication unit 12 of the user terminal 10 includes a circuit that can communicate with the LAN 50 in a wireless or wired manner. The first communication unit 12 can communicate with the administrator terminal 20, the printer 30, and the like via the LAN 50. In addition, the first communication unit 12 can communicate with the information processing apparatus 40 via the LAN 50 and the WAN 60. In the user terminal 10, the first communication unit 12 performs transmission and reception with respect to a communication destination. However, in the following description, the fact that the first communication unit 12 performs transmission and reception will be omitted for the sake of brevity. The first communication unit 12 communicates with the information processing apparatus 40 via the LAN 50 and the WAN 60. However, in the following description, the fact that the communication is performed via the LAN 50 and the WAN 60 will be omitted.

The first input/output unit 14 of the user terminal 10 is a user interface for the user. The first input/output unit 14 is, for example, a touch panel display. The first input/output unit 14 includes a display panel serving as an output unit that displays various pieces of information, and a detection panel serving as an input unit. The detection panel overlaps with the display panel. The detection panel detects an operation by a finger of a person by a method such as a capacitive method, a resistive method, or an optical method. In the first input/output unit 14, the input unit may be a keyboard, a mouse, or the like, and the output unit may be a stand-type liquid crystal display or the like.

The administrator terminal 20 includes a second control unit 21, a second communication unit 22, a second storage unit 23, and a second input/output unit 24. Since these components of the administrator terminal 20 are substantially the same as those of the user terminal 10, a description thereof will be omitted. The second communication unit 22 of the administrator terminal 20 can communicate with the user terminal 10, the printer 30, and the like via the LAN 50.

In addition, the administrator terminal 20 can also use the printer 30 by installing the driver in the second storage unit 23 in the same way as the user terminal 10. However, in the following description, it is assumed that the user terminal 10 uses the printer 30 instead of the administrator terminal 20. In the administrator terminal 20, the second communication unit 22 performs transmission and reception with respect to a communication destination. However, in the following description, similarly to the case of the user terminal 10, the fact that the second communication unit 22 performs transmission and reception will be omitted for the sake of brevity. The second communication unit 22 can also communicate with the information processing apparatus 40 via the LAN 50 and the WAN 60. However, in the following description, the fact that the communication is performed via the LAN 50 and the WAN 60 will be omitted.

The information processing apparatus 40 includes a fourth control unit 41, a fourth communication unit 42, a fourth storage unit 43, and a fourth input/output unit 44. Since these components of the information processing apparatus 40 are substantially the same as those of the user terminal 10, a description thereof will be omitted. The fourth communication unit 42 of the information processing apparatus 40 can communicate with the user terminal 10, the administrator terminal 20, the printer 30, and the like via the WAN 60 and the LAN 50.

In the information processing apparatus 40, the fourth communication unit 42 performs transmission and reception with respect to a communication destination. However, in the following description, similarly to the case of the user terminal 10, the fact that the fourth communication unit 42 performs transmission and reception will be omitted for the sake of brevity. The fourth communication unit 42 can communicate with the user terminal 10, the administrator terminal 20, the printer 30, and the like via the WAN 60 and the LAN 50. However, in the following description, the fact that the communication is performed via the WAN 60 and the LAN 50 will be omitted.

The fourth storage unit 43 of the information processing apparatus 40 stores various pieces of printing service information for providing a printing service related to the printer 30. Further, the fourth storage unit 43 also stores various pieces of contract information related to, for example, subscription, which is a contract for providing a printing service. Further, the fourth control unit 41 of the information processing apparatus 40 can provide a website through which the administrator terminal 20 and the user terminal 10 can access contents related to the printing service or contract, through the fourth communication unit 42. In this way, the information processing apparatus 40 can provide the printing service or the like as a so-called cloud service to the administrator terminal 20 and the user terminal 10. A server that provides the printing service may be provided separately from the information processing apparatus 40, and the user terminal 10 may be able to access the information processing apparatus 40 via the server. Further, a website accessible by the administrator terminal 20 and a website accessible by the user terminal 10 may be the same website or may be different websites.

The printer 30 includes a printing unit 34 including an ink jet type head for performing printing on paper, a transport mechanism for transporting paper, and the like. For example, the transport mechanism of the printing unit 34 can flip the paper to perform printing on both sides of the paper. In addition, the printer 30 includes a third control unit 31, a third communication unit 32, and a third storage unit 33.

Since these components of the printer 30 are substantially the same as those of the user terminal 10, a description thereof will be omitted.

In the printer 30, the third communication unit 32 can communicate with the administrator terminal 20, the user terminal 10, and the like via the LAN 50. The third communication unit 32 of the printer 30 can also communicate with the information processing apparatus 40 via the LAN 50 and the WAN 60. In the printer 30, the third communication unit 32 performs transmission and reception with respect to a communication destination. However, in the following description, similarly to the case of the user terminal 10, the fact that the third communication unit 32 performs transmission and reception will be omitted for the sake of brevity. The third communication unit 32 can communicate with the information processing apparatus 40 via the LAN 50 and the WAN 60. However, in the following description, the fact that the communication is performed via the LAN 50 and the WAN 60 will be omitted.

1-2. Printing Service

The information processing apparatus 40 can provide a printing service related to the printer 30 that can be used by the user terminal 10 under a printing service contract with the administrator terminal 20. When applying for a contract, the administrator operates the second input/output unit 24 of the administrator terminal 20 to access the website provided by the information processing apparatus 40. The second control unit 21 of the administrator terminal 20 transmits and receives contract information related to the printing service to and from the information processing apparatus 40 based on an operation of the second input/output unit 24 by the administrator and applies for the printing service contract. Contract information related to contract conclusion is stored in the second storage unit 23 of the administrator terminal 20 and the fourth storage unit 43 of the information processing apparatus 40.

When applying for a contract, the administrator terminal 20 transmits, to the information processing apparatus second identification (ID) information for specifying the administrator terminal 20 that manages the contract, first ID information for specifying the user terminal 10 that uses the printer 30, and third ID information for specifying the printer to be used by the user terminal 10 as part of the contract information. These pieces of ID information are stored in the storage units of the respective apparatuses, and can be acquired by the administrator terminal 20. Further, a company ID may exist for distinguishing and managing a plurality of companies.

These pieces of ID information may each be a mail address. Alternatively, each mail address may be contained in these pieces of ID information. Hereinafter, the first ID information, the second ID information, and the third ID information are simply referred to as a first ID, a second ID, and a third ID, respectively. The contract information also includes information regarding a contract expiration date, which is an expiration date of the printing service contract, a payment amount, a payment method, and the like. Further, the contract information may include information when leasing the printer 30 from the provider.

The fourth control unit 41 of the information processing apparatus 40 receives the first ID, second ID, and third ID from the administrator terminal 20, and stores the first ID, second ID, and third ID in the fourth storage unit 43 together with other contract information. The fourth control unit 41 of the information processing apparatus 40 can specify the user terminal 10, the administrator terminal 20, and the printer 30 based on the first ID, the second ID, and the third ID stored in the fourth storage unit 43, respectively. Then, the fourth control unit 41 can perform communication and processing related to the printing service based on the first ID, the second ID, and the third ID.

The fourth control unit 41 of the information processing apparatus 40 issues usage permission ID information for the printer 30 and stores the usage permission ID information in the fourth storage unit 43. Hereinafter, the usage permission ID information is simply referred to as a permission ID. The fourth control unit 41 transmits and receives the contract information to and from the administrator terminal 20 based on an operation of the fourth input/output unit 44 of the information processing apparatus 40 by the provider and transmits, when the contract is concluded, the permission ID and the first driver corresponding to the printing service to the administrator terminal 20. At this time, the fourth control unit 41 may transmit the permission ID also to the printer 30 and store the permission ID in the third storage unit 33 of the printer 30. The third control unit 31 of the printer 30 can also perform the printing service when it is determined that the permission ID has been received.

When receiving the permission ID and the first driver, the second control unit 21 of the administrator terminal 20 stores the permission ID and the first driver in the second storage unit 23 and transmits the permission ID and the first driver to the user terminal 10. When receiving the permission ID and the first driver, the user terminal 10 stores the permission ID and the first driver in the first storage unit 13 and installs the first driver in the driver storage unit 13a. The first control unit 11 of the user terminal 10 can read the first driver from the driver storage unit 13a and execute the first driver to generate a print job including the permission ID.

The fourth storage unit 43 of the information processing apparatus 40 stores the first ID, the second ID, and the third ID as the contract information in association with the permission ID. The first ID, the second ID, and the third ID are used when performing communication and processing that are related to the printing service. During the communication and processing that are related to the printing service, the fourth control unit 41 of the information processing apparatus 40 can refer to the fourth storage unit 43 to specify a communication source or communication destination based on the received first ID, second ID, and third ID, and can read the corresponding contract information to perform the processing related to the printing service. For example, when receiving the first ID during the communication and processing that are related to the printing service, the fourth control unit 41 of the information processing apparatus 40 can refer to the fourth storage unit 43 to specify the user terminal 10 and can read the contract information associated with the first ID to perform processing within a range of the contract.

Here, a printing service that causes the printer 30 to execute a print job generated by the user terminal 10 will be described. The user terminal 10 can generate the print job by using the first driver and transmit the print job to the information processing apparatus 40. The print job includes the first ID of the user terminal 10 as the communication source and the third ID of the printer 30 as the communication destination. When receiving the print job, the fourth control unit 41 of the information processing apparatus 40 refers to the fourth storage unit 43 to specify the user terminal 10 and the printer 30 and reads the contract information associated with the first ID or the third ID to determine whether or not the user terminal 10 and the printer 30 are a permitted communication source and a permitted communication destination, respectively. Further, the fourth control unit 41 determines whether or not a time at which the print job is received from the user terminal 10 is before the contract expiration date.

When receiving the print job and determining that the user terminal 10 and the printer 30 are a permitted communication source and a permitted communication destination, respectively, and that the print job is received before the contract expiration date, the fourth control unit 41 transmits the print job to the printer 30. When receiving the print job, the third control unit 31 of the printer 30 controls the printing unit 34 to perform printing. On the other hand, when receiving the print job and determining that the user terminal 10 and the printer 30 are not a permitted communication source and a permitted communication destination or determining that the time at which the print job is received is not before the contract expiration date, the fourth control unit 41 does not transmit the print job to the printer 30. Accordingly, the print job is not executed on the printer 30.

The fourth control unit 41 of the information processing apparatus 40 may determine whether or not to transmit the print job to the printer 30 based on the permission ID. In this case, the user terminal 10 generates the print job including the permission ID by using the first driver and transmits the print job to the information processing apparatus 40. When receiving the print job from the user terminal 10, the fourth control unit 41 of the information processing apparatus 40 compares the permission ID included in the print job with the permission ID stored as the information regarding the contract with the administrator terminal 20 in the fourth storage unit 43.

The fourth control unit 41 of the information processing apparatus 40 can transmit the print job to the printer 30 when determining that the permission IDs match each other. When receiving the print job, the third control unit 31 of the printer 30 controls the printing unit 34 to perform printing. On the other hand, the fourth control unit 41 does not transmit the print job to the printer 30 when determining that the permission IDs do not match each other. Accordingly, the print job is not executed on the printer 30.

As described above, in the printing service based on the contract information, the user terminal 10 can transmit a print job to the printer 30 via the information processing apparatus 40 to execute the print job. Therefore, for example, even when the user terminal 10 is outside the company 2 and is out of a communication range of the LAN 50 of the company 2, the user terminal 10 can use the printing service. That is, the user terminal 10 can communicate with the information processing apparatus 40 from outside the company 2 via the WAN 60 without the LAN 50. The user terminal 10 can directly transmit a print job to the information processing apparatus 40 via the WAN 60. Then, the information processing apparatus 40 can transmit a print job to the printer 30 of the company 2 via the WAN 60 and the LAN 50 and cause the printer 30 to execute the print job.

1-3. Control Method for Printing System

Here, a control method related to contract continuation processing in the printing system 1 will be mainly described. As described above, the fourth storage unit 43 of the information processing apparatus 40 stores the information regarding the contract related to the printing service with the administrator terminal 20. The contract information also includes the contract expiration date for the printing service. The fourth control unit 41 of the information processing apparatus 40 can refer to and manage the contract expiration date in the fourth storage unit 43.

The following transmission and reception between the administrator terminal 20 and the information processing apparatus 40 and the following transmission and reception between the user terminal 10 and the information processing apparatus 40 may be performed through the website provided by the information processing apparatus 40. The user terminal 10, the administrator terminal 20, and the information processing apparatus 40 can also execute the following various types of processing related to the printing service via the website provided by the information processing apparatus 40. At this time, the administrator terminal 20 can log into the website by using the second ID or the permission ID. The user terminal 10 can log into the website by using the first ID or the permission ID. The administrator terminal 20 and the user terminal 10 do not need to install and use a special application because the administrator terminal 20 and the user terminal 10 use the website provided by the information processing apparatus 40.

Figure 2:
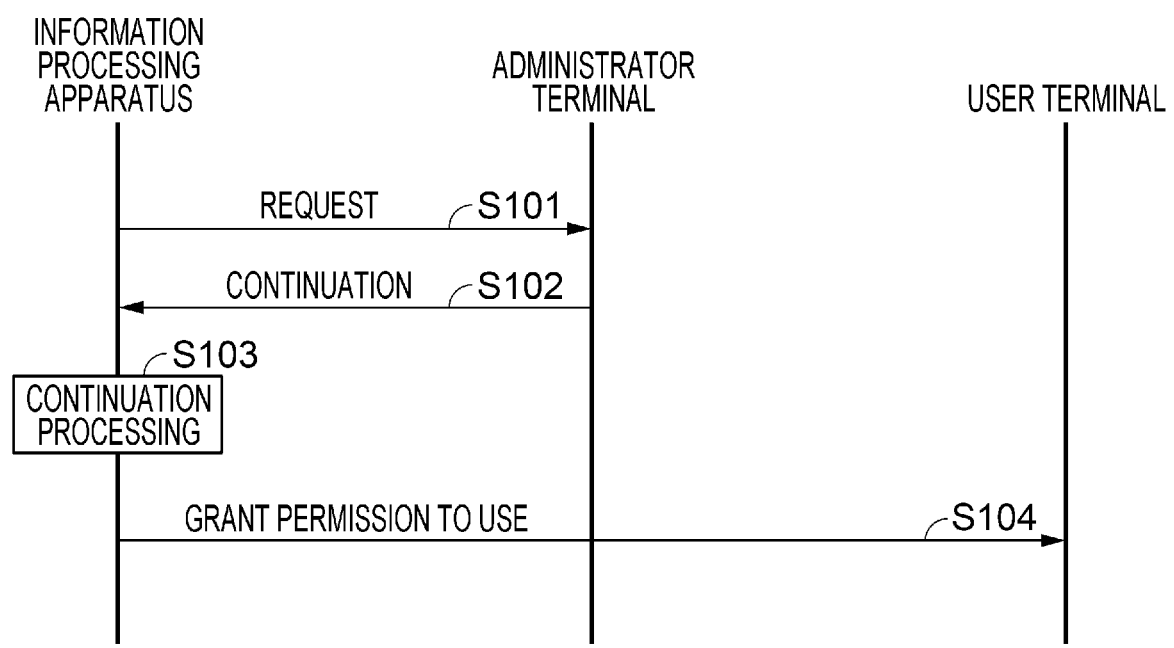
FIG. 2 is a state transition diagram illustrating control of the information processing apparatus, the administrator terminal, and the user terminal when a contract is continued.

FIG. 2 illustrates a case where contract continuation processing related to the printing service is executed between the information processing apparatus 40 and the administrator terminal 20. The fourth control unit 41 of the information processing apparatus 40 refers to the contract expiration date related to the printing service stored in the fourth storage unit 43, and when determining that the contract expiration date has been reached, the fourth control unit 41 transmits, to the administrator terminal 20, request information for requesting response information related to the contract (S101). The request information includes information indicating that the contract expiration date has been reached and selection information for selecting continuation or termination of the contract. Then, the fourth control unit 41 of the information processing apparatus 40 can receive the response information from the administrator terminal 20 even when the contract expiration date has been reached. In FIGS. 2 to 5, the term "information" is omitted in the description of the transmitted and received contents to be transmitted and received. For example, "request information" is simply written as "request".

When receiving the request information, the second control unit 21 of the administrator terminal 20 displays the content of the request information on the second input/output unit 24. When a contract continuation instruction is given based on an operation of the second input/output unit 24 by the administrator, the second control unit 21 transmits, to the information processing apparatus 40, continuation information indicating that contract continuation is selected, as the response information (S102).

When receiving the continuation information, the fourth control unit 41 of the information processing apparatus 40 displays the content of the continuation information on the fourth input/output unit 44. The fourth control unit 41 executes continuation processing based on an operation of the fourth input/output unit 44 by the provider (S103), and continuation of the contract with the administrator terminal 20 is achieved. The fourth control unit 41 of the information processing apparatus 40 grants permission to use the printing service to the user terminal 10 (S104). At this time, the fourth control unit 41 of the information processing apparatus 40 can also grant permission to use the printing service to the administrator terminal 20 as well.

Specifically, the fourth control unit 41 of the information processing apparatus 40 updates the contract expiration date to a new extended contract expiration date as the continuation processing, and stores the new contract expiration date in the fourth storage unit 43 as continued contract information. In this way, the continuation processing of updating the contract expiration date to a new contract expiration date by the information processing apparatus 40 grants permission to use the printing service to the user terminal 10. As a result, the user terminal 10 can continue to use the same first driver and the same permission ID and can cause the printer 30 to execute a print job. That is, the fourth control unit 41 of the information processing apparatus 40 can determine that a time at which the print job is received from the user terminal 10 is before the new contract expiration date. The information processing apparatus 40 can transmit the print job to the printer 30 and cause the printer 30 to execute the print job.

At this time, the fourth control unit 41 of the information processing apparatus 40 may issue a new permission ID for continuation as the continuation processing. The fourth control unit 41 may store the new permission ID as the contract information in the fourth storage unit 43 and may transmit the new permission ID to the administrator terminal 20 and to the user terminal 10 via the administrator terminal 20. The user terminal 10 can generate a print job including the new permission ID by using the first driver and transmit the print job to the information processing apparatus 40.

The fourth control unit 41 of the information processing apparatus 40 can refer to the contract information in the fourth storage unit 43 and determine that the new permission ID matches the new permission ID included in the print job. The information processing apparatus 40 can transmit the print job to the printer 30 and cause the printer 30 to execute the print job based on the matching of the new permission IDs.

Figure 3:
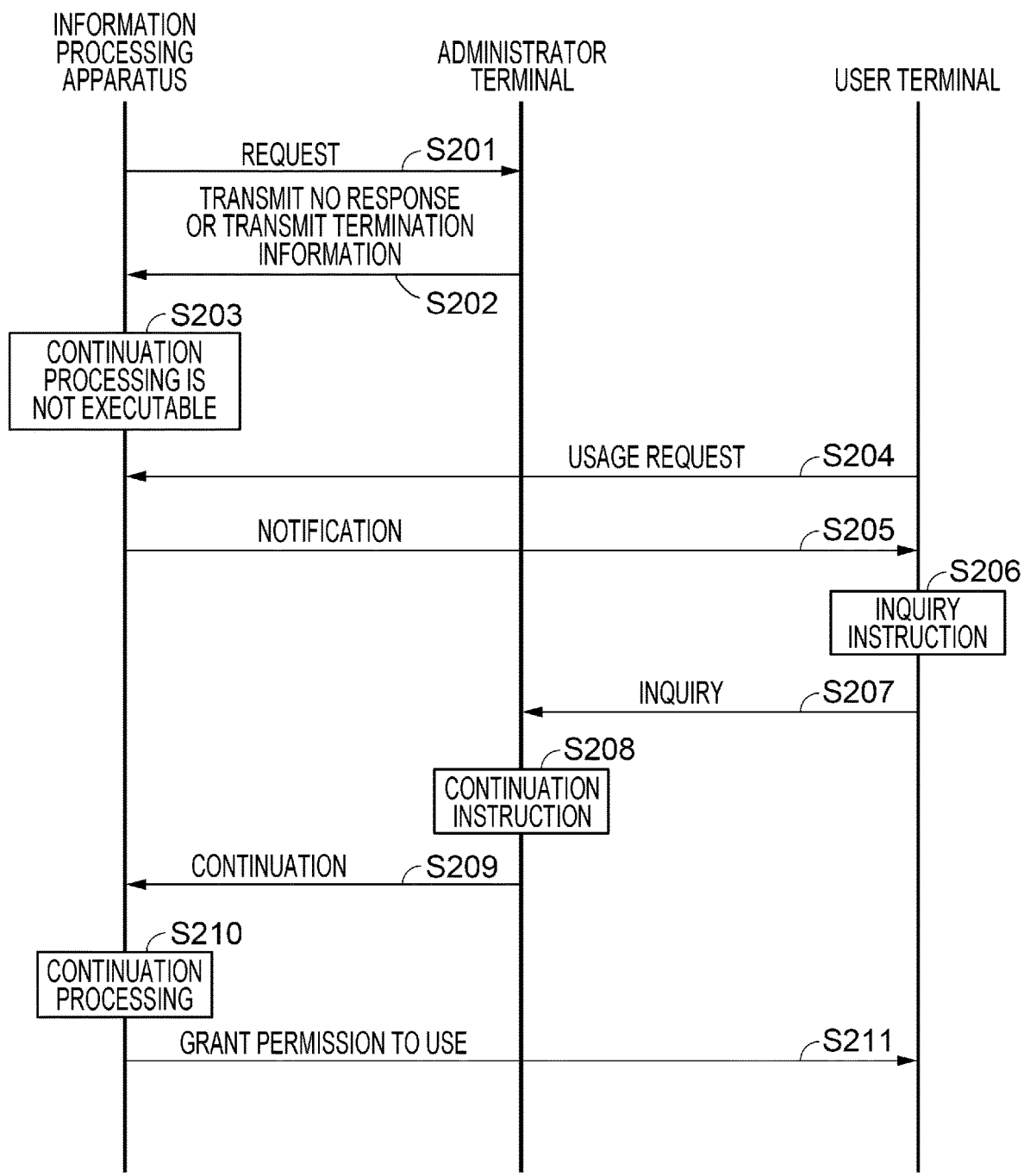
FIG. 3 is a state transition diagram illustrating control when a contract is continued in response to an inquiry from the user terminal.

FIG. 3 illustrates processing when the information processing apparatus 40 cannot execute the contract continuation processing based on the response information from the administrator terminal 20. Similarly to the case in FIG. 2, the fourth control unit 41 of the information processing apparatus 40 transmits the request information to the administrator terminal 20 when the contract expiration date for the printing service has been reached (S201).

The second control unit 21 of the administrator terminal 20 transmits termination information indicating that contract termination has been selected without continuing the contract as the response information to the information processing apparatus 40 based on an operation of the second input/output unit 24 by the administrator (S202). Alternatively, the administrator terminal 20 does not transmit the response information within a predetermined period such as before the contract expiration date and transmits no response (S202).

When receiving the termination information as the response information from the administrator terminal 20 or receiving no response information from the administrator terminal 20 within the predetermined period, the fourth control unit 41 of the information processing apparatus 40 cannot execute the continuation processing based on the response information. The fourth control unit 41 of the information processing apparatus 40 cannot execute the continuation processing based on the response information from the administrator terminal 20, and therefore, the continuation processing is not executable (S203).

Specifically, the fourth control unit 41 of the information processing apparatus 40 cannot update the contract expiration date to a new extended contract expiration date due to of termination information or lack of response from the administrator terminal 20. The information processing apparatus 40 terminates the contract related to the printing service with the administrator terminal 20. At this time, the fourth control unit 41 of the information processing apparatus 40 may invalidate the contract information stored in the fourth storage unit 43. For example, the fourth control unit 41 may invalidate the permission ID. The fourth control unit 41 may keep the first ID, second ID, and third ID valid for a predetermined period after the termination of the contract, so that the user terminal 10, the administrator terminal 20, or the like can, for example, log into the website.

As a result, even when receiving the print job from the user terminal 10, the fourth control unit 41 of the information processing apparatus 40 can refer to the fourth storage unit 43 and determine that a time at which the print job is received is not before the contract expiration date. Alternatively, even when receiving the print job from the user terminal 10, the fourth control unit 41 of the information processing apparatus can refer to the fourth storage unit 43 and determine that the permission ID is invalid and the permission IDs do not match. Even when receiving the print job from the user terminal the fourth control unit 41 of the information processing apparatus 40 determines that the conditions of the contract are not satisfied as described above, and thus, the fourth control unit 41 does not transmit the print job to the printer 30. Therefore, the user terminal 10 cannot cause the printer 30 to execute the print job. The same applies when the fourth control unit 41 of the information processing apparatus 40 receives a print job from the administrator terminal 20.

Incidentally, a user of the user terminal 10 does not know that the administrator of the administrator terminal 20 terminated the contract or did not continue the contract in some cases. Therefore, the user terminal 10 generates a print job and transmits the print job to the information processing apparatus 40 even after the contract expiration date in some cases. However, as described above, the information processing apparatus 40 determines that the print job received from the user terminal 10 does not satisfy the conditions of the contract, and therefore, the print job cannot be executed by the printer 30. Therefore, the first control unit 11 of the user terminal 10 transmits usage request information for requesting usage of the printing service to the information processing apparatus 40 based on an operation of the first input/output unit 14 by the user (S204).

When receiving the usage request information for the printing service from the user terminal 10 (S204), the fourth control unit 41 of the information processing apparatus 40 transmits notification information to the user terminal 10 (S205). That is, when the continuation processing cannot be executed based on the response information from the administrator terminal 20, and the usage request information for requesting the use of the printing service is received from the user terminal 10, the fourth control unit 41 of the information processing apparatus 40 transmits the notification information related to the contract to the user terminal 10. That is, when the continuation processing cannot be executed based on the response information from the administrator terminal 20, the fourth control unit 41 of the information processing apparatus 40 may transmit the notification information to the user terminal 10 even in a case in which the usage request information for requesting the use of the printing service is not received from the user terminal 10. The fourth control unit 41 of the information processing apparatus 40 does not have to transmit the notification information to the user terminal 10 when the response information received from the administrator terminal 20 is the continuation information.

When receiving the notification information, the first control unit 11 of the user terminal 10 displays the content of the notification information on the first input/output unit 14. The notification information includes information indicating that the contract has expired, that the contract has been terminated by the administrator, or that the contract is not continued. The notification information also includes information for executing inquiry instruction processing for the administrator terminal 20 and can be displayed on the first input/output unit 14 of the user terminal 10. The first control unit 11 of the user terminal 10 executes the inquiry instruction processing when an inquiry instruction for contract continuation is given based on an operation of the first input/output unit 14 by the user (S206), and the first control unit 11 transmits inquiry information for inquiring about continuation of the contract related to the printing service to the administrator terminal 20 (S207).

That is, when the inquiry instruction for contract continuation is given based on the notification information, the first control unit 11 of the user terminal 10 transmits the inquiry information for inquiring about contract continuation to the administrator terminal 20. When receiving the inquiry information from the user terminal 10, the second control unit 21 of the administrator terminal 20 displays the content of the inquiry information on the second input/output unit 24. When the contract continuation instruction is given based on an operation of the second input/output unit 24 by the administrator, the second control unit 21 executes continuation instruction processing of giving a contract continuation instruction (S208), and transmits, to the information processing apparatus 40, the continuation information indicating that the contract continuation instruction is given (S209).

Thereafter, the fourth control unit 41 of the information processing apparatus 40 similarly executes the continuation processing (S103), the granting of the permission to use (S104), and other processing described with reference to FIG. 2. That is, when receiving the continuation information, the fourth control unit 41 of the information processing apparatus 40 executes the continuation processing based on an operation of the fourth input/output unit 44 by the provider (S210) to continue the contract with the administrator terminal 20, and the fourth control unit 41 grants permission to use the printing service to the user terminal 10 (S211).

Specifically, the fourth control unit 41 of the information processing apparatus 40 updates the contract expiration date to a new extended contract expiration date as the continuation processing, and stores the new contract expiration date in the fourth storage unit 43 as continued contract information. As a result, the fourth control unit 41 of the information processing apparatus 40 can determine that a time at which a print job is received from the user terminal 10 is before the new contract expiration date and can transmit the print job to the printer 30 and cause the printer 30 to execute the print job.

As described above, the fourth control unit 41 of the information processing apparatus 40 transmits the notification information related to the contract to the user terminal 10 when the continuation processing cannot be executed based on the response information from the administrator terminal 20. With the notification information transmitted from the information processing apparatus 40 to the user terminal 10 as a trigger, the user terminal 10 can cause the administrator terminal 20 to continue the contract and can use the printing service. The user terminal 10 can continue to use the same first driver and the same permission ID and can cause the printer 30 to execute a print job.

Figure 4:
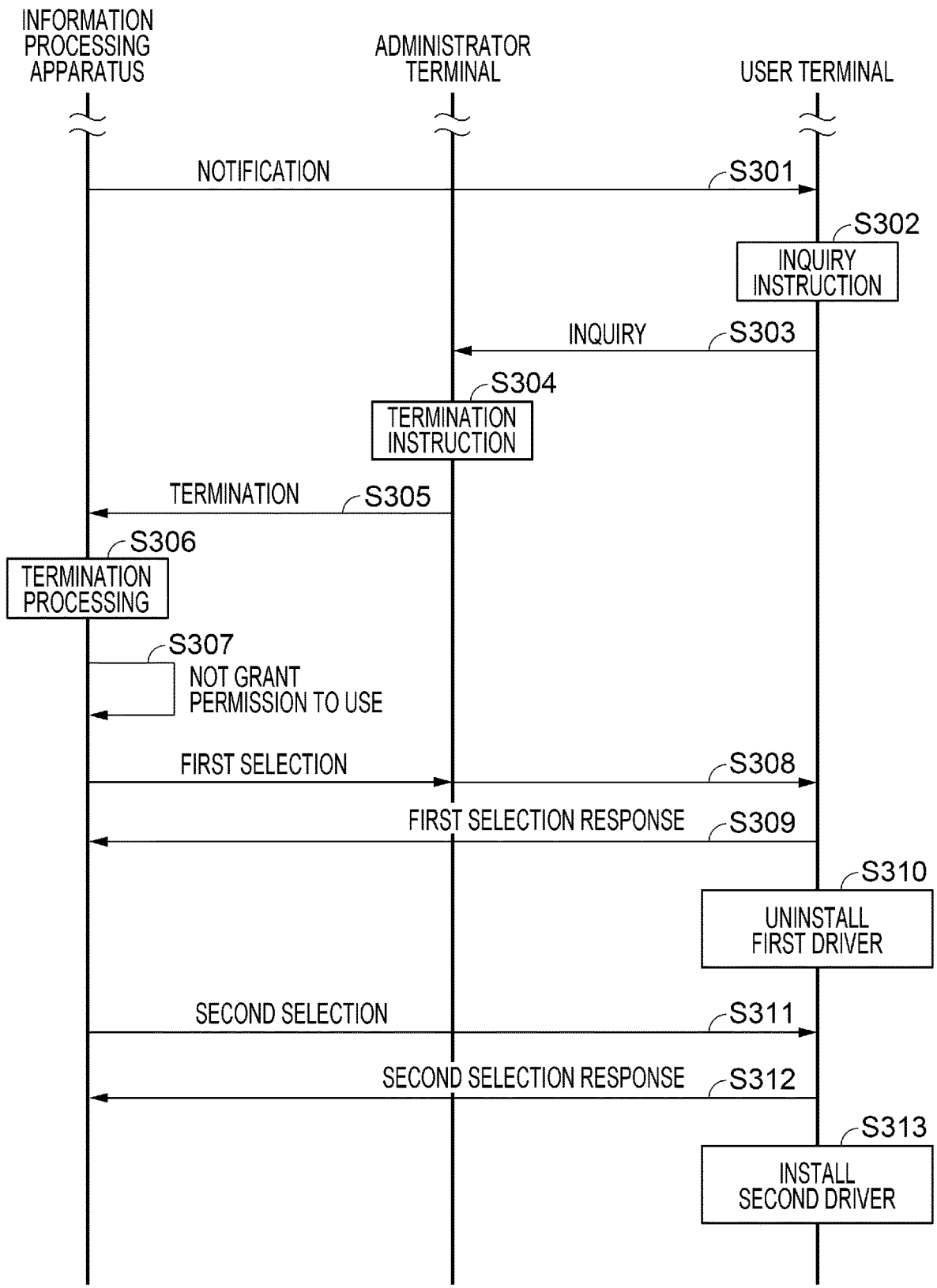
FIG. 4 is a state transition diagram illustrating control of uninstallation of a first driver and installation of a second driver when a contract is terminated.

Next, processing for the information processing apparatus 40 to cause the user terminal 10 to switch the driver when the contract is terminated will be described with reference to FIG. 4. The first driver corresponding to the printing service is installed in the driver storage unit 13a of the first storage unit 13 of the user terminal 10.

Similarly to the case in FIG. 3, the information processing apparatus 40, the administrator terminal 20, and the user terminal 10 perform, in advance, transmitting the request information (S201), transmitting the termination information or transmitting no response information (S202), disabling the continuation processing (S203), and transmitting the usage request information (S204) when the contract expiration date related to the printing service has been reached. Thereafter, similarly to the case in FIG. 3, the information processing apparatus 40 transmits the notification information to the user terminal 10 (S301), and the user terminal 10 executes the inquiry instruction processing (S302) and transmits the inquiry information to the administrator terminal 20 (S303) in FIG. 4. The processing of (S301) may be a response when the user terminal accesses the information processing apparatus.

Here, unlike the case in FIG. 3, the second control unit 21 of the administrator terminal 20 executes termination instruction processing for giving a contract termination instruction based on an operation of the second input/output unit 24 by the administrator (S304) and transmits to the information processing apparatus 40 the termination information indicating that the contract termination instruction is given (S305). When receiving the termination information from the administrator terminal 20, the fourth control unit 41 of the information processing apparatus 40 executes termination processing related to the contract (S306).

Specifically, the fourth control unit 41 of the information processing apparatus 40 terminates the contract as the termination processing and does not update the contract expiration date to a new contract expiration date. At this time, the fourth control unit 41 may invalidate the contract information stored in the fourth storage unit 43. Further, for example, the fourth control unit 41 may invalidate the permission ID. As a result, when receiving a print job from the user terminal 10, the fourth control unit 41 of the information processing apparatus 40 can refer to the fourth storage unit 43 and determine that a time at which the print job is received is not before the contract expiration date. Alternatively, when receiving the print job from the user terminal 10, the fourth control unit 41 of the information processing apparatus 40 can refer to the fourth storage unit 43 and determine that the permission ID is invalid and the permission IDs do not match.

Even when receiving the print job from the user terminal 10, the fourth control unit 41 of the information processing apparatus 40 determines that the conditions of the contract are not satisfied as described above, and thus, the fourth control unit 41 does not transmit the print job to the printer 30, so that the user terminal 10 cannot use the printer 30 (S307). Therefore, the user terminal 10 cannot cause the printer 30 to execute the print job. The same applies when the fourth control unit 41 of the information processing apparatus 40 receives a print job from the administrator terminal 20. Further, since the user terminal 10 cannot use the printing service, for example, when the user terminal 10 is outside the communication range of the LAN 50, the user terminal 10 cannot communicate with the information processing apparatus 40 via the WAN 60 without the LAN 50. The same applies to the administrator terminal 20 as well.

Next, the fourth control unit 41 of the information processing apparatus 40 that has received the termination information from the administrator terminal 20 transmits first selection information including information for selection of whether or not to uninstall the first driver corresponding to the printing service to the user terminal 10 (S308). The first selection information also includes a program for uninstalling the first driver.

The first control unit 11 of the user terminal 10 receives the first selection information and displays the first selection information on the first input/output unit 14. Here, a case where the first control unit 11 of the user terminal 10 selects uninstallation of the first driver based on an operation of the first input/output unit 14 by the user and executes corresponding processing is assumed. The first control unit 11 of the user terminal 10 transmits, to the information processing apparatus 40, first selection response information including information indicating that uninstallation of the first driver is selected, the first selection response information being a response to the first selection information (S309). Then, the first control unit 11 executes the uninstallation program included in the first selection information to uninstall the first driver (S310). The same applies to the administrator terminal 20 as well.

When receiving the first selection response information, the fourth control unit 41 of the information processing apparatus 40 transmits, to the user terminal 10, second selection information including information for selection of whether or not to install the second driver that does not correspond to the printing service unlike the first driver corresponding to the printing service (S311). The second selection information also includes the second driver and a program for installing the second driver.

Here, a case where the first control unit 11 of the user terminal 10 selects installation of the second driver based on an operation of the first input/output unit 14 by the user and executes corresponding processing is assumed. The first control unit 11 of the user terminal 10 transmits, to the information processing apparatus 40, second selection response information including information indicating that installation of the second driver is selected, the second selection response information being a response to the second selection information (S312). Then, the first control unit 11 executes the installation program included in the second selection information to install the second driver (S313). The same applies to the administrator terminal 20 as well. The first selection response information and the second selection response information described above do not have to be transmitted to the information processing apparatus 40. Alternatively, the first driver may be uninstalled after the second driver is installed. Further, the uninstallation of the first driver and the installation of the second driver can be independently selected without being affected by the selection of one of them.

Even when a print job is generated by the first driver, the first control unit 11 of the user terminal 10 cannot use the printing service and thus cannot transmit the print job to the printer 30 via the WAN 60 and the information processing apparatus 40. However, the first control unit 11 of the user terminal 10 can generate a print job by using the second driver, transmit the print job to the printer 30 via the LAN 50, and cause the printer 30 to execute the print job. The function of the printer 30 for the second driver may be more limitative as compared with that for the first driver. For example, the first driver can support double-sided printing, while the second driver does not support double-sided printing.

On the other hand, a case where the first control unit 11 of the user terminal 10 selects not to uninstall the first driver based on an operation of the first input/output unit 14 by the user and executes corresponding processing is assumed. The first control unit 11 of the user terminal 10 transmits, to the information processing apparatus 40, first selection response information including information indicating that uninstallation is not selected, the first selection response information being a response to the first selection information. The fourth control unit 41 of the information processing apparatus 40 does not have to transmit the second selection information to the user terminal 10 when the first selection response information including the information indicating that the uninstallation is not selected is received from the user terminal 10.

Further, a case where the first control unit 11 of the user terminal 10 selects not to install the second driver based on an operation of the first input/output unit 14 by the user and executes corresponding processing is assumed. The first control unit 11 of the user terminal 10 transmits, to the information processing apparatus 40, second selection response information including information indicating that installation is not selected, the second selection response information being a response to the second selection information. Then, the first control unit 11 of the user terminal 10 does not install the second driver.

Figure 5:
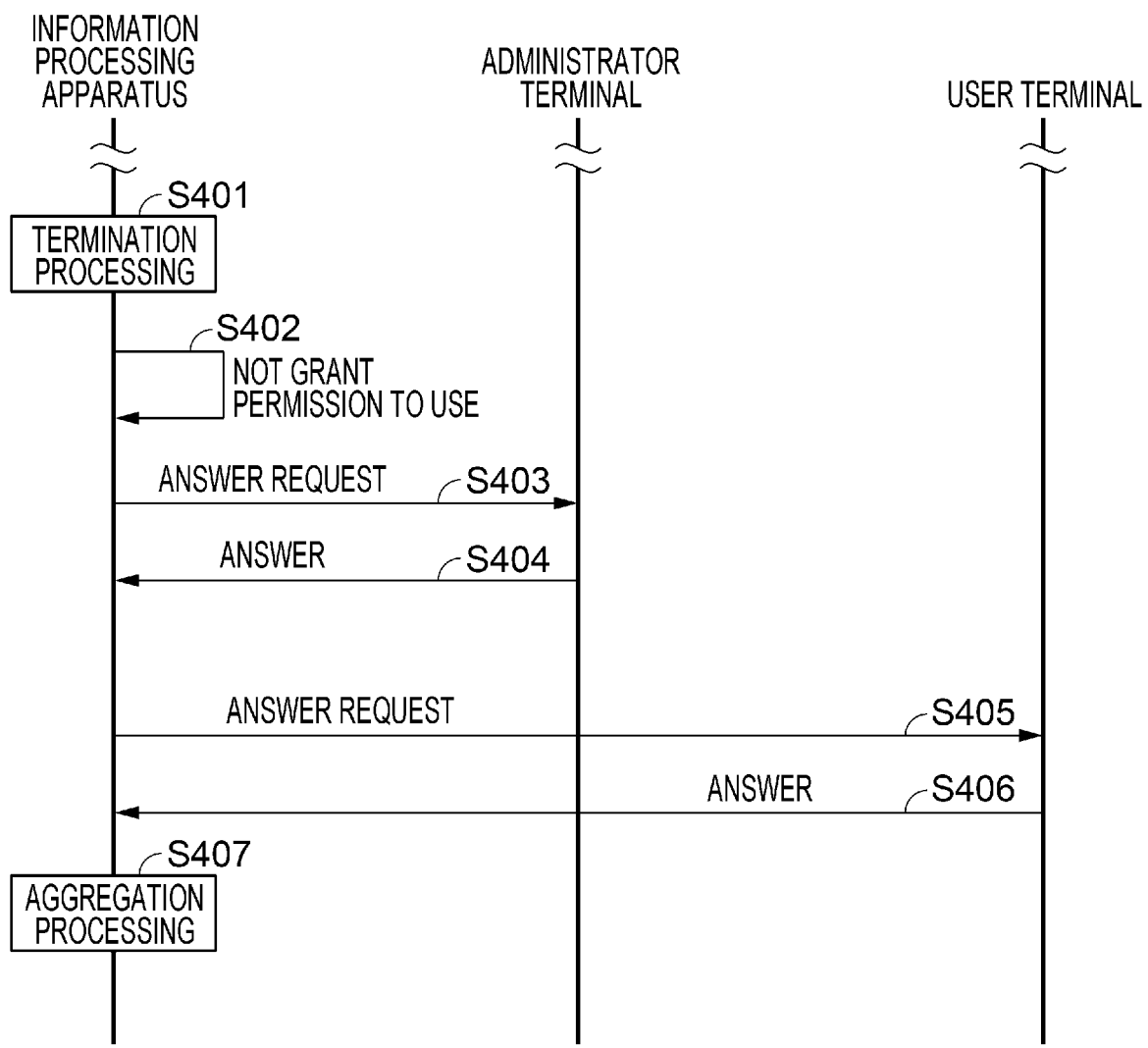
FIG. 5 is a state transition diagram illustrating control for aggregating answers to a questionnaire when a contract is terminated.

Next, processing of requesting the user terminal 10 and the administrator terminal 20 for answers to a questionnaire by the information processing apparatus 40 at the time of contract termination and aggregating the answers will be described with reference to FIG. 5. The questionnaire includes evaluation items for the printing service. Similarly to the case in FIG. 4, the fourth control unit 41 of the information processing apparatus 40 in advance executes the termination processing based on the termination information from the administrator terminal 20 (S401), and even when receiving a print job from the user terminal 10, the fourth control unit 41 does not transmit the print job to the printer 30, so that the user terminal 10 cannot use the printer 30 (S402).

The fourth control unit 41 of the information processing apparatus 40 transmits, to the administrator terminal 20, answer request information for requesting an answer to the questionnaire regarding the printing service (S403). Questionnaire information is also included in the answer request information. The second control unit 21 of the administrator terminal 20 transmits answer information including answers to the questionnaire to the information processing apparatus 40 based on an operation of the second input/output unit 24 by the administrator (S404).

Furthermore, the fourth control unit 41 of the information processing apparatus 40 transmits the answer request information also to the user terminal 10 (S405). The first control unit 11 of the user terminal 10 transmits answer information including answers to the questionnaire to the information processing apparatus 40 based on an operation of the first input/output unit 14 by the user (S406). The fourth control unit 41 of the information processing apparatus 40 executes aggregation processing based on the answer information received from the user terminal 10 and the administrator terminal 20 (S407). The aggregation processing includes calculating a frequency distribution of the evaluation items for the printing service. The fourth control unit 41 of the information processing apparatus 40 may transmit the answer request information to any one of the user terminal 10 and the administrator terminal 20, or may transmit the answer request information when receiving the continuation information.

As described above, in the printing system 1 according to the present embodiment, when it is determined based on the contract expiration date that the contract expiration date for the printing service has been reached, the information processing apparatus 40 transmits, to the administrator terminal 20, the request information for requesting the response information related to the contract. The information processing apparatus 40 transmits the notification information to the user terminal 10 when the continuation processing cannot be executed, based on the response information from the administrator terminal 20. The user terminal 10 transmits, based on the notification information, the inquiry information for inquiring about contract continuation to the administrator terminal 20. The administrator terminal 20 transmits, based on the inquiry information, to the information processing apparatus 40, the continuation information indicating that the contract continuation instruction is given.

The information processing apparatus 40 executes the continuation processing based on the continuation information to continue the contract with the administrator terminal 20 and grants permission to use the printing service to the user terminal 10. As described above, in the printing system 1 according to the present embodiment, when there is an administrator who manages a contract separately from the user who uses the printer 30, usage of the printer by the user and contract management by the administrator can be properly performed.

Hereinabove, the present embodiment has been described in detail with reference to the drawings, but the specific configuration is not limited to the embodiments, and modifications, substitutions, deletions, and the like may be made without departing from the gist of the disclosure. Although the printing unit 34 of the printer 30 has been described as an example of an ink jet type head using ink, other types may be used. For example, the printing unit 34 may be an electrophotographic type using toner.

Each program for implementing the functions of any component in any apparatus described above may be recorded in a computer-readable recording medium, and the program may be read and executed by a computer system. The "computer-readable recording medium" refers to a portable medium such as a flexible disc, a magneto-optical disc, a read-only memory (ROM), or a compact disc (CD)-ROM, or a storage device such as a hard disk embedded in the computer system. The "computer-readable recording medium" refers to a recording medium that holds a program for a certain period of time, such as a volatile memory inside the computer system that serves as a server or client when the program is transmitted via a network such as the Internet or a communication line such as a telephone line.

The program described above may be transmitted from the computer system that stores the program in a storage device or the like to another computer system via a transmission medium or by transmission waves in a transmission medium. Here, the "transmission medium" for transmitting the program refers to a medium having a function of transmitting information. Example of such a medium include a network such as the Internet or a communication line such as a telephone line. The program described above may be a program for implementing some of the functions described above. Further, the program described above may be a so-called differential file or differential program, which can implement the functions described above in combination with a program already recorded in the computer system.

What is claimed is:

1. A printing system comprising:
an administrator terminal;
a user terminal; and
an information processor that provides a printing service related to a printer configured to be used by the user terminal, wherein the information processor
transmits, based on an expiration date of a contract for the printing service, request information for requesting response information related to the contract to the administrator terminal,
is configured to receive the response information from the administrator terminal, and
transmits notification information related to the contract to the user terminal when the information processor does not execute, based on the response information from the administrator terminal, continuation processing for the contract,
the user terminal
receives the notification information from the information processor, and
transmits inquiry information for inquiring about continuation of the contract to the administrator terminal when an inquiry instruction for continuation of the contract is given based on the notification information,
the administrator terminal
receives the inquiry information from the user terminal, and
transmits continuation information for continuing the contract to the information processor when an instruction for continuation of the contract is given based on the inquiry information, and
the information processor
receives the continuation information from the administrator terminal, and
executes, based on the continuation information, the continuation processing, and grants permission to use the printing service to the user terminal.

2. The printing system according to claim 1, wherein when the information processor does not execute, based on the response information from the administrator terminal, the continuation processing for the contract means when the response information received from the administrator terminal is termination information for terminating the contract or when the response information is not received from the administrator terminal within a predetermined period.

3. The printing system according to claim 1, wherein the information processor does not transmit the notification information to the user terminal when the response information received from the administrator terminal is the continuation information.

4. The printing system according to claim 1, wherein when the information processor does not execute, based on the response information from the administrator terminal, the continuation processing, and a usage request for the printing service is received from the user terminal, the information processor transmits the notification information to the user terminal.

5. The printing system according to claim 1, wherein a first driver corresponding to the printing service is installed in the user terminal,
the information processor transmits, to the user terminal, first selection information for selection of whether or not to uninstall the first driver when the response information received from the administrator terminal is termination information for terminating the contract, and
the user terminal receives the first selection information from the information processor and transmits first selection response information to the information processor to select whether or not to uninstall the first driver to execute processing, the first selection response information being a response to the first selection information.

6. The printing system according to claim 1, wherein
a first driver corresponding to the printing service is installed in the user terminal,
the information processor transmits, to the user terminal, second selection information for selection of whether or not to install a second driver that does not correspond to the printing service when the response information received from the administrator terminal is termination information for terminating the contract, and
the user terminal receives the second selection information from the information processor and transmits second selection response information to the information processor to select whether or not to install the second driver to execute processing, the second selection response information being a response to the second selection information.

7. The printing system according to claim 1, wherein
the information processor transmits, to the administrator terminal, answer request information for requesting answer information to a questionnaire regarding the printing service when the response information received from the administrator terminal is termination information for terminating the contract,
the administrator terminal transmits the answer information to the information processor when receiving the answer request information, and
the information processor receives the answer information and executes aggregation processing.

8. The printing system according to claim 1, wherein
the information processor transmits, to the user terminal, answer request information for requesting answer information to a questionnaire regarding the printing service when the response information received from the administrator terminal is termination information for terminating the contract,
the user terminal transmits the answer information to the information processor when receiving the answer request information, and
the information processor receives the answer information and executes aggregation processing.

9. A control method for a printing system including an administrator terminal, a user terminal, and an information processor that provides a printing service related to a printer configured to be used by the user terminal, the control method comprising:
transmitting, by the information processor, based on an expiration date of a contract for the printing service, request information for requesting response information related to the contract to the administrator terminal;
receiving, by the information processor, the response information from the administrator terminal;
transmitting, by the information processor, notification information related to the contract to the user terminal when the information processor does not execute, based on the response information from the administrator terminal, continuation processing for the contract;
receiving, by the user terminal, the notification information from the information processor;
transmitting, by the user terminal, inquiry information for inquiring about continuation of the contract to the administrator terminal when an inquiry instruction for continuation of the contract is given based on the notification information;
receiving, by the administrator terminal, the inquiry information from the user terminal;
transmitting, by the administrator terminal, continuation information for continuing the contract to the information processor when an instruction for continuation of the contract is given based on the inquiry information;
receiving, by the information processor, the continuation information from the administrator terminal; and
executing, by the information processor, based on the continuation information, the continuation processing and granting permission to use the printing service to the user terminal.

* * * * *